US007334133B2

(12) United States Patent
Goubin

(10) Patent No.: US 7,334,133 B2
(45) Date of Patent: Feb. 19, 2008

(54) METHOD FOR MAKING A COMPUTER SYSTEM IMPLEMENTING A CRYPTOGRAPHIC ALGORITHM SECURE USING BOOLEAN OPERATIONS AND ARITHMETIC OPERATIONS AND A CORRESPONDING EMBEDDED SYSTEM

(75) Inventor: Louis Goubin, Paris (FR)

(73) Assignee: Axalto, S.A., Montrouge (FR)

( * ) Notice: Subject to any disclaimer, the term of this patent is extended or adjusted under 35 U.S.C. 154(b) by 687 days.

(21) Appl. No.: 10/468,130

(22) PCT Filed: Feb. 14, 2002

(86) PCT No.: PCT/FR02/00579

§ 371 (c)(1),
(2), (4) Date: Jan. 5, 2004

(87) PCT Pub. No.: WO02/065692

PCT Pub. Date: Aug. 22, 2002

(65) Prior Publication Data

US 2004/0139136 A1 Jul. 15, 2004

(30) Foreign Application Priority Data

Feb. 15, 2001 (FR) .................................. 01 02091

(51) Int. Cl.
*G06F 11/30* (2006.01)

(52) U.S. Cl. ....................... 713/190; 713/189; 713/194
(58) Field of Classification Search ................ 713/189, 713/190, 194; 726/22
See application file for complete search history.

(56) References Cited

U.S. PATENT DOCUMENTS 6,873,706 B1 * 3/2005 Miyazaki et al. ............. 380/30

OTHER PUBLICATIONS

Carolynn Burwick, Don Coppersmith, Edward D'Avignon, Rosario Gennaro, Shai Halevi, Charanjit Jutla, Stephen M. Matyas, Luke O'Connor, Mohammad Peyravian, David Safford and Nevenko Zunic, "MARS—A Candidate Cipher for AES," Proposal for the AES, Jun. 1998. Available at http://www.research.ibm.cim/security/mars.pdf.

Suresh Chari, Charantjit S. Jutla, Josyula R. Rao and Pankaj Rohatgi, "Towards Sound Approaches to Counteract Power-Analysis Attacks," in Proceedings of Advances in Cryptology—CRYPTO '99, Springer-Verlag, 1999, pp. 398-412.

(Continued)

*Primary Examiner*—Gilberto Barron, Jr.
*Assistant Examiner*—Cordelia Kane
(74) *Attorney, Agent, or Firm*—Miles & Stockbridge P.C.; Edward J. Kondracki

(57) ABSTRACT

The invention relates to security for computer systems and a method for protecting computer systems, particularly those employing an encryption for the protection of sensitive information. A cryptographic algorithm is implemented in the protected system using Boolean operations and arithmetic operations wherein at least one variable is separated into several parts, in a Boolean separation using a Boolean operation, and in an arithmetic separation using an arithmetic operation. In order to switch from one of the operations to the other, a predetermined number of Boolean and arithmetic operations is performed on the parts and at least one random number, so that for each of the values appearing during the operation, there is no correlation with the variable.

24 Claims, 3 Drawing Sheets

OTHER PUBLICATIONS

Jean-Sébastien Coron and Louis Goubin, "On Boolean and Arithmetic Masking against Differential Power Analysis," in Proceedings of Workshop on Cryptographic Hardware and Embedded Systems, Springer-Verlag, Aug. 2000.

Louis Goubin and Jacques Patarin, "DES and Differential Power Analysis—The Duplication Method," in Proceedings of Workshop on Cryptographic Hardware and Embedded Systems, Springer-Verlag, Aug. 1999, pp. 158-172.

Paul Kocher, Joshua Jaffe and Benjamin Jun, "Introduction to Differential Power Analysis and Related Attacks," http://www.cryptography.com/dpa/technical, 1998.

Paul Kocher, Joshua Jaffe and Benjamin Jun, "Differential Power Analysis," in Proceedings of Advances in Cryptology—CRYPTO '99, Springer-Verlag, 1999, pp. 388-397.

Xuejia Lai and James Massey, "A Proposal for a New Block Encryption Standard," in Advances in Cryptology—EUROCRYPT '90 Proceedings, Springer-Verlag, 1991, pp. 389-404.

Thomas S. Messerges, "Securing the AES Finalists Against Power Analysis Attacks," in Proceedings of Fast Software Encryption Workshop 2000, Springer-Verlag, Apr. 2000.

Ronald L. Rivest, Matthew J.B. Robshaw, Ray Sidney and Yiqun L. Yin, "The RC6 Block Cipher," v.1.1, Aug. 20, 1998. Available at ftp://ftp.rsasecurity.com/pub/rsalabs/aes/rc6v11.pdf.

Bruce Schneier, John Kelsey, Doug Whiting, David Wagner, Chris Hall and Niels Ferguson, "Twofish: A 128-Bit Block Cipher," Jun. 15, 1998, AES submission available at http://www.counterpane.com/twofish.pdf.

Colron, J-S et al: "On Boolean and Arithmetic Masking Against Differential Power Analysis" Cryptographic Hardware and Embedded Systems International Workshop, Ches 2000, Aug. 17, 2000, pp. 231-237, XP000989986, Worchester (US). Cited in the Application, p. 234, Line 24-p. 235, Line 24.

Goubin L: "A Sound Method for Switching Between Boolean and Arithmetic Masking" Cryptographic Hardware and Embedde Systems, 34D Int'l Workshop, Ches 2001, Paris France, May 14-16, 2001, Proceedings, Lecture Notes in Computer Science, Berlin: Springer, DE, vol. 2162, May 14, 2001, p. 3-15, XP008002644, ISBN: 3-540-42521-7, p. 6, Line 8-p. 9, Line 21.

\* cited by examiner

METHOD FOR MAKING A COMPUTER SYSTEM IMPLEMENTING A CRYPTOGRAPHIC ALGORITHM SECURE USING BOOLEAN OPERATIONS AND ARITHMETIC OPERATIONS AND A CORRESPONDING EMBEDDED SYSTEM

FIELD OF THE INVENTION

The present invention relates to security for computer systems and more particularly to a method for securing and protecting computer systems, particularly those, such as smart cards, employing encryption algorithms for the protection of sensitive information.

BACKGROUND OF THE INVENTION

Paul Kocher et al. introduced in 1998 [5] and published in 1999 [6] the concept of "Differential Power Analysis," also known as DPA as a method of encrypted messages. The initial targets were symmetric cryptosystems such as the Data Encryption Standard (DES) or Advanced Encryption Standard (AES) candidates, but public-key cryptosystems have since proven equally vulnerable to DPA attacks.

In 1999, Chari et al. [2] suggested a generic countermeasure that consisted of separating all the intermediate variables. A similar "duplication" method was proposed by Goubin et al. [4], in a particular case. These general methods generally sharply increase the amount of memory or the computation time required, as noted by Chari et al. Furthermore, it has been demonstrated that even the intermediate steps can be attacked by DPA, so the separation of the variables must be performed in every step of the algorithm. This makes the question of additional memory and computation time even more crucial, particularly for embedded systems such as smart cards.

In 2000, Thomas Messerges [8] studied DPA attacks applied to the AES candidates. He developed a general countermeasure that consisted of masking all the inputs and outputs of each elementary operation executed by the microprocessor. This generic technique allowed him to assess the impact of these countermeasures on the five AES candidates.

However, for algorithms that combine Boolean functions and arithmetic functions, it is necessary to use two types of masks. One therefore needs a method for converting between the Boolean masking and the arithmetic masking. This is typically the case for IDEA [7] and for three of the AES candidates: MARS [1], RC6 [9] and Twofish [10].

T. Messerges [8] has proposed an algorithm for performing this conversion. Unfortunately, Coron and Goubin [3] have described a specific attack showing that the "BooleanToArithmetic" algorithm proposed by T. Messerges is insufficient for protecting oneself against DPA. Likewise, his "ArithmeticToBoolean" algorithm isn't foolproof either.

SUMMARY OF THE INVENTION

The object of the present invention is to propose two novel "BooleanToArithmetic" and "ArithmeticToBoolean" algorithms, which have proven to be foolproof against DPA attacks. Each of these algorithms uses only operations that are very simple: XOR (exclusive OR), AND, subtraction, and the "shift left" of a register. The "BooleanToArithmetic" algorithm uses a constant number (equal to 7) of such elementary operations, while the number of elementary operations involved in the "ArithmeticToBoolean" algorithm is proportional (it equals 5K+5) to the size (i.e., the number of bits K) of the registers of the processor.

DESCRIPTION OF THE PREFERRED EMBODIMENTS(S)

Figure 1:
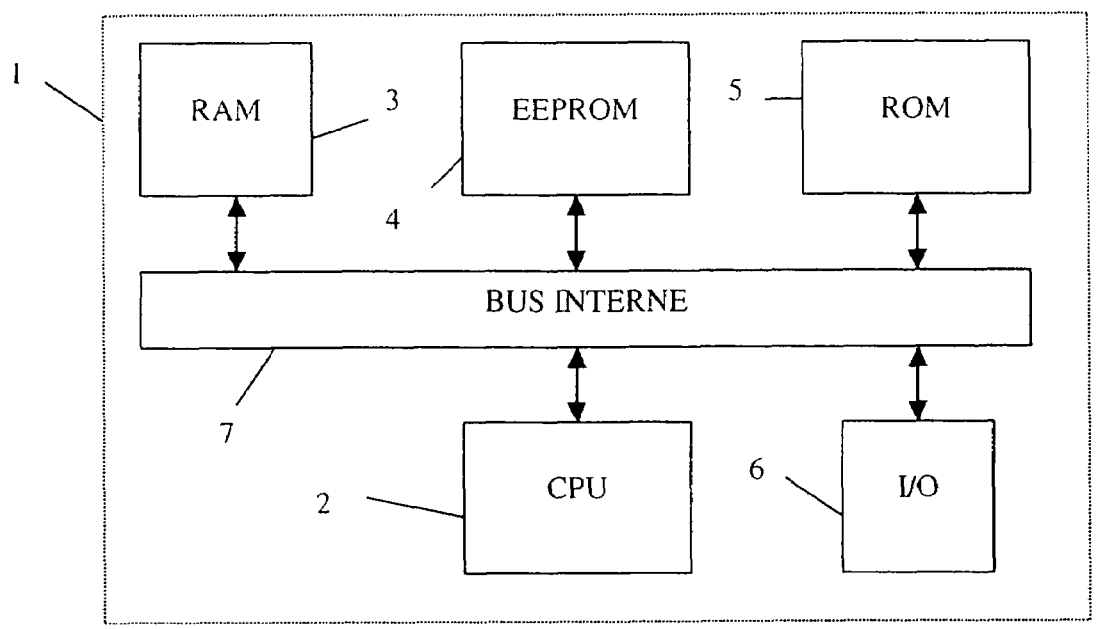
FIG. 1 is a block diagram of a smart card employing conversion means in the information storage elements for protection against DPA attacks.

"Differential Power Analysis" (DPA) is an attack that makes it possible to obtain information on the secret key (contained in a smart card or cryptographic token, for example), by exploring characteristic behaviors of transistor logic gates and software running in smart cards and other cryptographic devices and performing a statistical analysis of recordings of electric power consumption measured over a large number of calculations with the same key.

This attack does not require any knowledge of the individual power consumption of each instruction, or of the position of each of these instructions in time. It is applied in exactly the same way as soon as the attacker knows the outputs of the algorithm and the corresponding consumption curves. It is based solely on the following fundamental hypothesis:

Fundamental hypothesis: There is an intermediate variable, appearing during the calculation of the algorithm, such that the knowledge of a few bits of the key, (in practice less than 32 bits) makes it possible to decide whether or not two inputs, (or respectively two outputs), give the same value for this variable.

The Masking Method

The present invention concerns the "masking" method suggested by Chari et al. [2]. "Towards Sound Approaches to Counteract Power Analysis Attacks, *Proceedings of Advanced Cryptology*, CRYPTO '99, Springer-Vertag, pp. 398-412.

The basic principle consists of programming the algorithm so that the above fundamental hypothesis on which DPA is based is no longer verified (i.e., no intermediate variable ever depends on the knowledge of an easily accessible subset of the secret key). More precisely, using a key sharing schema, each of the intermediate variables appearing in the cryptographic algorithm is separated into several parts. This way, an attacker is obligated to analyze distributions from several points, which increases his task exponentially in terms of the number of elements of the separation.

The Conversion Problem

For algorithms that combine Boolean functions and arithmetic functions, two types of masking must be used:

A Boolean masking: $x'=x \oplus r$.

An arithmetic masking: $A=x-r$ modulo $2^K$.

In this case, the variable x is masked by the random value r, which gives the masked value x' (or A). The objective is to find an effective algorithm for switching from the Boolean masking to the arithmetic masking and vice versa, while making sure that the intermediate variables are de-correlated from the data to be masked, which ensures DPA resistance.

Throughout the present document, the processor is assumed to be using K-bit registers (in practice, most of the time K is equal to 8, 16, 32 or 64). All of the arithmetic operations (such as addition "+," subtraction "−," or doubling "z→2.z" are considered to be modulo $2^K$. For purposes of simplicity, the "modulo $2^{K}$" will often be omitted herein.

To this end, the invention concerns a method and apparatus for securing and protecting sensitive information within a computer system comprising a processor and a memory, and a cryptographic algorithm stored in the further memory. The cryptographic algorithm is implemented to protect sensitive information handled by the computer. Boolean operations and arithmetic operations, are utilized to protect the sensitive information. At least one variable is separated into several parts, in a Boolean separation using the Boolean operation, and in the arithmetic separation using an arithmetic operation. In order to switch from either of these operations to the other, a predetermined number of Boolean and arithmetic operations is performed on said parts and at least one random number by means of the processor, so that for each of the values appearing during the operation, there is no correlation with said variable, the operation producing a result stored in the memory.

Advantageously, in order to switch from the Boolean separation to the arithmetic separation, the method includes the following steps:

separating all but one of the parts into at least two elements;

calculating at least two partial results that never depend on all the elements of a part;

in order to obtain all but one part of the arithmetic separation, gathering at least two of said partial results.

Advantageously, the separation of said parts into at least two elements uses a Boolean operation.

Advantageously, said gathering of two of said partial results is done by means of a Boolean operation.

Advantageously, the Boolean operation used for the separation of said parts into at least two elements is the "exclusive OR" operation.

Advantageously, the Boolean operation used for the gathering of said partial results is executed by means of the "exclusive OR" operation.

Advantageously, in order to switch from the Boolean separation to the arithmetic separation, only the "exclusive OR" and "subtraction" operations are used.

Advantageously, the Boolean separation into two parts using the "exclusive OR" operation, and the arithmetic separation into two parts using the "addition" operation, the method is characterized in that, in order to switch from the Boolean separation to the arithmetic operation, five "exclusive OR" operations and two "subtraction" operations are used.

Advantageously, in order to switch from the arithmetic separation to the Boolean separation, one defines at least one variable obtained by means of a predetermined number of successive iterations from an initial value that is a function of at least one random number, through successive applications of a transformation based on Boolean and arithmetic operations that is applied to said parts of the arithmetic separation and to said at least one random number.

Advantageously, said transformation is based on the "exclusive OR," "logical AND" and "logical shift left by 1 bit" operations.

Advantageously, all but one part of the Boolean separation is obtained by applying Boolean operations to said variable or variables obtained through successive iterations, to said parts of the arithmetic separation, and to said random number or numbers.

Advantageously, the Boolean operations applied in order to obtain all but one of the parts of the Boolean separation are the "exclusive OR" and "logical shift left by 1 bit" operations.

Advantageously, the method for securing a computer system using K-bit registers, the arithmetic separation into two parts using the "addition" operation and the Boolean separation into two parts using the "exclusive OR" operation, (2K+4) "exclusive OR" operations, (2K+1) "logical AND" operations, and K "logical shift left by 1 bit" operations are used in order to switch from the Boolean separation to the arithmetic operation.

The invention also concerns an embedded system comprising a processor and a memory and a cryptographic algorithm adapted to be implemented and stored in the memory Boolean operations and arithmetic operations are utilized, wherein at least one variable of the algorithm is separated into several parts, in a Boolean separation using a Boolean operation, and in an arithmetic separation using an arithmetic operation. In-order to switch from either of these separations to the other, conversion means are provided for performing a predetermined number of Boolean and arithmetic operations on said parts and at least one random number by means of the processor, so that for each of the values appearing during the operation, there is no correlation with said variable, the operation producing a result stored in the memory.

The description that follows should be considered in conjunction with FIG. 1 which represents the configuration of a smart card capable of executing the inventive method.

From the Boolean Masking to the Arithmetic Masking

To calculate $A=(x\oplus r)-r$, the following algorithm is used:

"Boolean to Arithmetic" Algorithm

Input: (x', r) such that $x=x'\oplus r$.

Output: (A, r) such that $x=A+r$.

Initialize Γ at a random value γ

T←x'⊕Γ

T←T−Γ

T←T⊕x'

Γ←Γ⊕r

A←x'⊕Γ

A←A−Γ

A←A⊕T

The "BooleanToArithmetic" algorithm uses 2 auxiliary variables (T and Γ), 1 call to the random generator, and 7 elementary operations (more precisely: 5 "XORs" and 2 subtractions).

From the Arithmetic Masking to the Boolean Masking

To calculate $x'=(A+r)\oplus r$, the following algorithm is used:

"ArithmeticToBoolean" Algorithm

Input: (A, r) such that $x=A+r$.

Output: (x', r) such that $x=x'\oplus r$.

Initialize Γ at a random value γ

T←2.Γ x'←Γ⊕r

Ω←Γ∧x' x'←T⊕A

Γ←Γ⊕x'

Γ←Γ∧r

Ω←Ω⊕Γ

Γ←T∧A

Ω←Ω⊕Γ

```
FOR k=1 to K−1
    Γ←T∧r
    Γ←Γ⊕Ω
    T←T∧A
    Γ←Γ⊕T
    Γ←Γ⊕T
    T←2.Γ
ENDFOR
x'←x'⊕T
```

The "ArithmeticToBoolean" algorithm uses 3 auxiliary variables (T, Ω and Γ), 1 call to the random generator, and (5K+5) elementary operations (more precisely (2K+4) "XORs," (2K+1) "ANDs" and K "shift lefts").

As for the number of random numbers involved in the method according to the invention, it is noted that there may be one or several of them per variable, and in the case of several variables, there will generally be several random numbers, respectively associated with said variables.

FIG. 1 illustrates the general configuration of a smart card 1. It includes an information processing means or CPU 2, information storage means 3, 4, 5 of various types (RAM, EEPROM, ROM), input/output means 6 that allow the card to cooperate with a card reading terminal, and a bus 7 that allows these various elements to dialog with one another. The aforementioned conversion means capable of performing the Boolean and arithmetic operations specifically include at least one program as described herein and stored in the information storage means 3, 4, 5.

Figure 2:
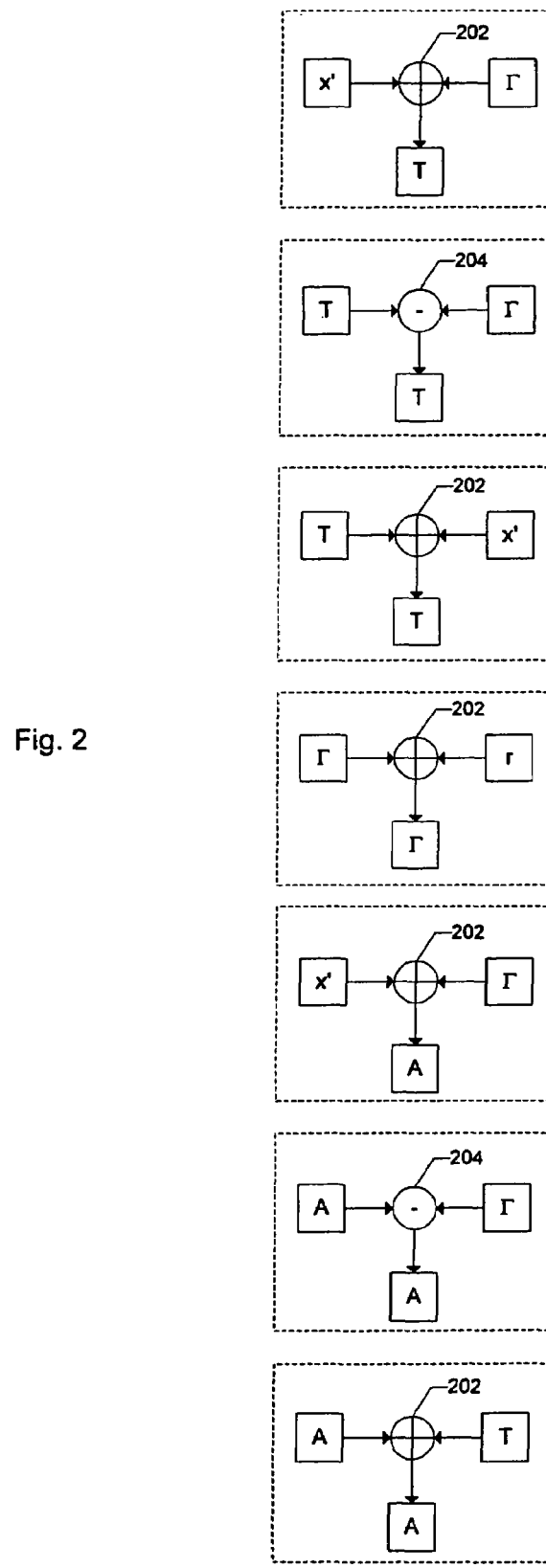
FIG. 2 is a graphical representation of the Boolean to Arithmetic algorithm

FIG. 2 is a graphical representation of the Boolean to Arithmetic algorithm, which includes the exclusive OR 202 and subtraction 204 operators.

Figure 3:
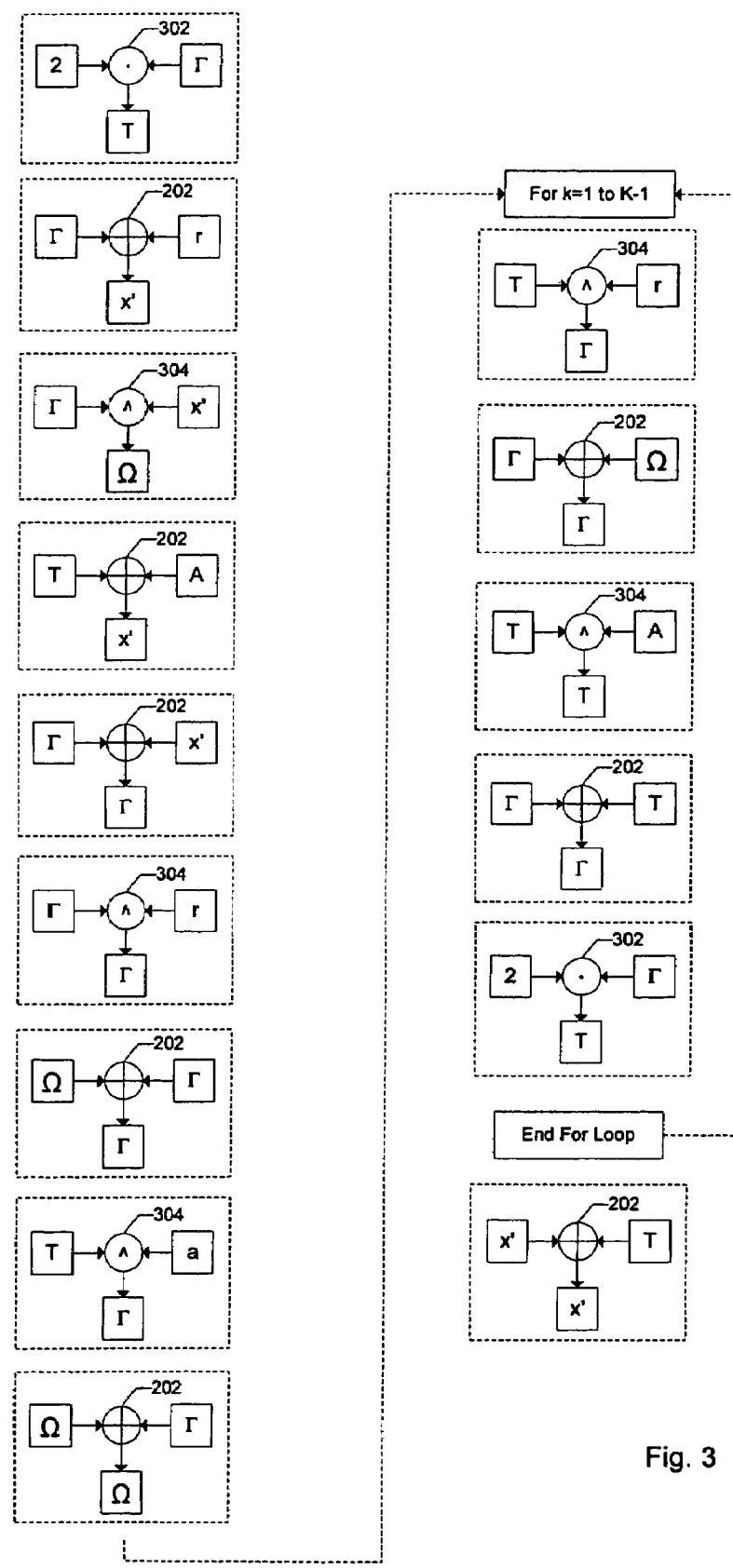
FIG. 3 is a graphical representation of the Arithmetic to Boolean algorithm.

FIG. 3 is a graphical representation of the Arithmetic to Boolean algorithm, which includes the shift left 302 (multiply by 2), AND 304, and the exclusive OR 202 operators.

BIBLIOGRAPHY

Reference to the following publications will provide a more thorough understanding of the prior art.

[1] Carolynn Burwick, Don Coppersmith, Edward D'Avignon, Rosario Gennaro, Shai Halevi, Charanjit Jutla, Stephen M. Matyas, Luke O'Connor, Mohammad Peyravian, David Safford and Nevenko Zunic, "MARS—A Candidate Cipher for AES," *Proposal for the AES*, June 1998. Available at http://www.research.ibm.comlsecurity/mars.pdf

[2] Suresh Chari, Charantjit S. Jutla, Josyula R. Rao and Pankaj Rohatgi, "Towards Sound Approaches to Counteract Power-Analysis Attacks," in *Proceedings of Advances in Cryptology*—CRYPTO '99, Springer-Verlag, 1999, pp. 398-412.

[3] Jean-Sébastien Coron and Louis Goubin, "On Boolean and Arithmetic Masking against Differential Power Analysis," in *Proceedings of Workshop on Cryptographic Hardware and Embedded Systems*, Springer-Verlag, August 2000.

[4] Louis Goubin and Jacques Patarin, "DES and Differential Power Analysis—The Duplication Method," in *Proceedings of Workshop on Cryptographic Hardware and Embedded Systems*, Springer-Verlag, August 1999, pp. 158-172.

[5] Paul Kocher, Joshua Jaffe and Benjamin Jun, "Introduction to Differential Power Analysis and Related Attacks," http://www.cryptography.com/dpa/technical, 1998.

[6] Paul Kocher, Joshua Jaffe and Benjamin Jun, "Differential Power Analysis," in *Proceedings of Advances in Cryptology*—CRYPTO '99, Springer-Verlag, 1999, pp. 388-397.

[7] Xuejia Lai and James Massey, "A Proposal for a New Block Encryption Standard," in *Advances in Cryptology—EUROCRYPT '90 Proceedings*, Springer-Verlag, 1991, pp. 389-404.

[8] Thomas S. Messerges, "Securing the AES Finalists Against Power Analysis Attacks," in *Proceedings of Fast Software Encryption Workshop* 2000, Springer-Verlag, April 2000.

[9] Ronald L. Rivest, Matthew J. B. Robshaw, Ray Sidney and Yiqun L. Yin, "The RC6 Block Cipher," v.1.1, Aug. 20, 1998. Available at ftp://ftp.rsasecurity.con/pub/rsalabs/aes/rc6v11.pdf

[10] Bruce Schneier, John Kelsey, Doug Whiting, David Wagner, Chris Hall and Niels Ferguson, "Twofish: A 128-Bit Block Cipher," Jun. 15, 1998, AES submission available at http://www.counterpane.com/twofish.pdf

The invention claimed is:

1. A method for making an electronic-system employing a cryptographic algorithm secure, comprising:
    processing information using said cryptographic algorithm and at least one variable;
    separating said at least one variable into multiple parts according to a Boolean separation using at least one Boolean operation of said cryptographic algorithm and also according to an arithmetic separation using at least one arithmetic operation of said cryptographic algorithm; and
    converting one of said Boolean separation and said arithmetic separation to the other said separation by performing a predetermined number of said Boolean and arithmetic operations on said parts and on at least one random number so that for each of one or more values produced during said cryptographic processing, there is no correlation with said at least one variable, to protect said at least one variable against external detection.

2. The method according to claim 1, wherein to convert from the Boolean separation to the arithmetic separation, the method further comprises:
    separating all but one of the parts into at least two elements;
    calculating at least two partial results that never depend on all the elements of a part; and
    gathering at least two of said partial results in order to obtain all but one part of the arithmetic separation.

3. The method according to claim 2, in which the separation of said parts into said at least two elements uses a Boolean operation.

4. The method according to claim 2, in which said gathering of two of said partial results is done using a Boolean operation.

5. The method according to claim 3, in which the Boolean operation used for the separation of said parts into at least two elements is an "exclusive OR" operation.

6. The method according to claim 4, in which the Boolean operation used for the gathering of said partial results uses the "exclusive OR" operation.

7. The method according to claim 6, wherein to from the Boolean separation to the arithmetic separation, only the "exclusive OR" and "subtraction" operations are used.

8. The method according to claim 6, wherein for the Boolean separation into two parts using the "exclusive OR" operation, and the arithmetic separation into two parts using the "addition" operation, to convert from the Boolean separation to the arithmetic operation, five "exclusive OR" operations and two "subtraction" operations are used.

9. The method according to claim 1, further comprising converting from the arithmetic separation to the Boolean separation by defining said at least one variable obtained from a predetermined number of successive iterations from an initial value that is a function of at least one random number, through successive applications of a transformation based on Boolean and arithmetic operations applied to said parts of the arithmetic separation and to said at least one random number.

10. The method according to claim 9, in which said transformation is based on "exclusive OR," "logical AND" and "logical shift left by 1 bit" operations.

11. The method according to claim 9, characterized in which all but one part of the Boolean separation is obtained by applying Boolean operations to said variable or variables obtained through successive iterations, to said parts of the arithmetic separation, and to said random number or numbers.

12. The method according to claim 11, in which the Boolean operations applied in order to obtain all but one of the parts of the Boolean separation are the "exclusive OR" and "logical shift left by 1 bit" operations.

13. The method according to claim 12, further comprising:
using K-bit registers to convert from the Boolean separation to the arithmetic separation, the arithmetic separation into two parts using the "addition" operation and the Boolean separation into two parts using the "exclusive OR" operation, and
using (2K+4) "exclusive OR" operations, (2K+1) "logical AND" operations, and K "logical shift left by 1 bit" operations.

14. An embedded system comprising:
information processing means,
information storage means, and
cryptographic algorithm processing means adapted to be implemented using Boolean operations and arithmetic operations, wherein at least one variable is separated into multiple parts by a Boolean separation using a Boolean operation, and by an arithmetic separation using an arithmetic operation, said cryptographic algorithm processing means configured to convert one of said Boolean separation and said arithmetic separation to the other said separation by performing a predetermined number of said Boolean and said arithmetic operations on said parts and on at least one random number, so that for each value produced during cryptographic processing-, there is no correlation with said at least one variable, to protect said at least one variable against external detection.

15. The embedded system according to claim 14, wherein said cryptographic processing means is configured to convert from the Boolean separation to the arithmetic separation by,
separating all but one of the parts into at least two elements;
calculating at least two partial results that never depend on all the elements of a part; and
gathering at least two of said partial results in order to obtain all but one part of the arithmetic separation.

16. The embedded system according to claim 15, in which the separation of said parts into said at least two elements uses a Boolean operation.

17. The embedded system according to claim 15, in which said gathering of two of said partial results uses a Boolean operation.

18. The embedded system according to claim 16, in which the Boolean operation is an "exclusive OR" operation.

19. The embedded system according to claim 17, in which the Boolean operation is an "exclusive OR" operation.

20. The embedded system according to claim 14, in which to convert from the Boolean separation to the arithmetic operation, five "exclusive OR" operations and two "subtraction" operations are used.

21. The embedded system according to claim 14, in which to convert from the arithmetic separation to the Boolean separation, the cryptographic processing means is configured to define at least one variable obtained from a predetermined number of successive iterations from an initial value that is a function of at least one random number, through successive applications of a transformation based on Boolean and arithmetic operations applied to said parts of the arithmetic separation and to said at least one random number.

22. The embedded system according to claim 21, in which said Boolean operations applied to said parts of the arithmetic separation and to said at least one random number include "exclusive OR," "logical AND," and "logical shift left by 1 bit" operations.

23. The embedded system according to claim 22, in which said cryptographic processing means further comprises K-bit registers, said cryptographic processing means configured to perform said arithmetic separation into two parts using an "addition" operation and said Boolean separation into two parts using the "exclusive OR" operation, and is further configured to convert from the Boolean separation to the arithmetic separation using (2K+4) "exclusive OR" operations, (2K+1) "logical AND" operations, and K "logical shift left by 1 bit" operations.

24. The embedded system of claim 14 wherein the system comprises a smart card.

* * * * *